United States Patent [19]

Sakaya et al.

[11] Patent Number: 4,854,372
[45] Date of Patent: Aug. 8, 1989

[54] CORRUGATED HEAT PIPE

[75] Inventors: Masuji Sakaya, Narahino; Tsuneaki Motai, Yachiyo; Masataka Mochizuki, Nagareyama; Kouichi Mashiko, Tokyo, all of Japan

[73] Assignee: Fujikura Ltd., Tokyo, Japan

[21] Appl. No.: 302,764

[22] Filed: Jan. 26, 1989

Related U.S. Application Data

[62] Division of Ser. No. 164,560, Mar. 7, 1988.

[30] Foreign Application Priority Data

Mar. 11, 1987 [JP] Japan ............................ 62-53975
Apr. 10, 1987 [JP] Japan ............................ 62-86989
May 15, 1987 [JP] Japan ............................ 62-117168

[51] Int. Cl.$^4$ .............................................. F28D 15/02
[52] U.S. Cl. ........................................ 165/46; 165/45; 165/104.21; 165/906; 60/641.2
[58] Field of Search ................... 165/46, 45, 104.21, 165/104.26, 906; 60/641.2; 62/260

[56] References Cited

U.S. PATENT DOCUMENTS 4,402,358  9/1983  Wolf ................................ 165/32

FOREIGN PATENT DOCUMENTS 88593    5/1983  Japan ........................... 165/104.26
1108323  8/1984  U.S.S.R. ............................ 165/46

OTHER PUBLICATIONS

"Development of Ultra Large Scale Gravity-Assisted Heat Pipe" (printed in Fujikura Ltd. Technical Review vol. 73 published in Aug. 1987 written by Shiraishi et al.).

Primary Examiner—Albert W. Davis, Jr.
Attorney, Agent, or Firm—Frishauf, Holtz, Goodman & Woodward

[57] ABSTRACT

A corrugated heat pipe sealed at both ends is disclosed, having a longitudinally corrugated peripheral wall and containing operating liquid therein. The corrugated heat pipe comprises inside a rope-like tension member extending therethrough in its longitudinal direction and secured at both ends. The rope-like tension member has the effect of preventing the corrugated heat pipe from elongation due to the weight thereof when the pipe is inserted in the ground, thus eliminating the possibility of local flattening of the corrugated outer periphery or of breakage of the pipe. Further, even when the coefficient of thermal expansion of the rope-like tension member differs from that of the corrugated heat pipe, since the corrugated heat pipe has its outer periphery corrugated in a wavy form in the longitudinal direction, it can sufficiently absorb the thermal expansion of the rope-like tension member. Thus, the corrugated heat pipe will not be broken, even when the coefficient of thermal expansion of the corrugated heat pipe differes from that of the rope-like tension member.

8 Claims, 9 Drawing Sheets

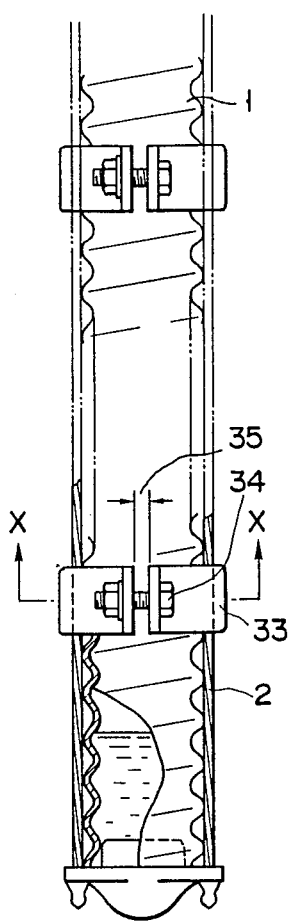
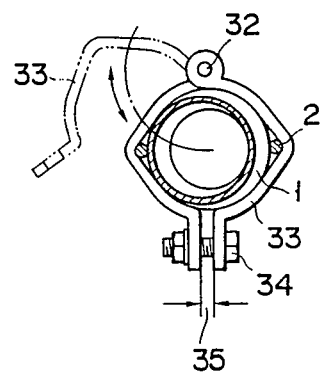
FIG. 9
FIG. 10

CORRUGATED HEAT PIPE

This is a division of application Ser. No. 164,560 filed Mar. 7, 1988, pending.

BACKGROUND OF THE INVENTION

1. Field of the Invention

This invention relates to a corrugated heat pipe for conducting terrestrial heat onto the surface of the ground for utilizing it for melting snow, power generation and so forth.

2. Description of the Related Art

Heretofore, a corrugated heat pipe is used to conduct terrestrial heat onto the ground surface from hot water in the ground by heat conduction, without depriving the ground of hot water or steam. Several tens or hundreds rigid heat pipes of steel or alloy steel, each, for example of 10 long are laid out at the installation site and connected one by one, using male and female screws, to obtain a single long heat pipe which is then inserted in the ground. A pipe having this structure can sufficiently withstand the hanging load and also radial pressure externally applied to it is the depth of the ground. This method of installation, however, has problems as regards operability. The operation performed when the pipes are connected on the installation site encounters great difficulties depending on status and environments of the installation site. Nevertheless, the installing method is used in which the pipes are connected on the installation site. This is because if a single long steel or alloy steel heat pipe is completed in factory, it can not be transported to the installation site, because of its size and weight. There has been a proposal for improving the operability on the site. This proposal is to provide a heat pipe having flexibility and reduced wall thickness. If a single long corrugated heat pipe having flexibility and reduced wall thickness is completed in factory, it can be readily transported to the installation site by winding it onto a drum. In addition, the flexible material is very light in weight compared to steel or alloy steel. The flexible heat pipe is used as thermal siphon and is buried in the ground by inserting it into the ground to a depth of 200 to 5,000 m.

However, this method has the following problems.

Since a pipe as long as several hundred to several thousand meters is buried such that it is suspended at the ground surface into the ground, it is subject to elongation due to its own weight, resulting in flattening of its corrugated outer peripheral surface or breakage of it. The flattening of the corrugated outer peripheral surface leads to fluctuations of the heat transfer characteristics in the longitudinal direction.

When in the ground, the pipe is liable to be crushed due to a radial external pressure applied to it. Generally, the pipe experiences as high pressure as 0.12 kg/cm$^2$ multiplied by the depth in meters. In the depth of several thousand meters, the pipe experiences an external pressure of several hundred kg/cm$^2$, so that it will be crushed if it has reduced wall thickness.

To solve the above problems, in the case of a power cable used for a mining pit, a steel wire is wound closely helically on the entire outer periphery of the inner sheath, and the helically wound steel wire is covered by an outer sheath of vinyl or polyethylene. In this case, however, the handling of a hanger at the top of heat pipe is a very difficult operation. In addition, when the heat pipe provided with this means is insertedly buried in the ground, its flexibility is spoiled due to its very great weight. Further, the use of the vinyl or polyethylene sheath gives rise to the problems of the resistance against the terrestrial heat at high temperatures of 200° C. or above and reduction of the heat conductivity.

SUMMARY OF THE INVENTION

The present invention has been intended in the light of the above, and it has an object of providing a corrugated heat pipe, which can be insertedly buried in the ground without possibility of elongation due to the weight, leading to flattening of its corrugated outer periphery or its breakage.

Another object of the invention is to provide a corrugated heat pipe, which will not be crushed by externally applied radial pressure when it is insertedly buried in the ground.

According to the invention, there is provided a corrugated heat pipe sealed at both ends, having a longitudinally corrugated peripheral wall and containing operating liquid therein, which corrugated heat pipe includes inside a rope-like tension member extending through it in its longitudinal direction and secured at both ends. The rope-like tension member has an effect of preventing the corrugated heat pipe from elongating due to the weight thereof when the pipe is inserted in the ground, thus eliminating the possibility of local flattening of the corrugated outer periphery or of breakage of the pipe. Further, even when the coefficient of thermal expansion of the rope-like tension member differs from that of the corrugated heat pipe, since the corrugated heat pipe has its outer periphery corrugated in a wavy form in the longitudinal direction, it can sufficiently absorb the thermal expansion of the rope-like tension member. Thus, the corrugated heat pipe will not be broken, even when the coefficient of thermal expansion of the corrugated heat pipe differes from that of the rope-like tension member.

Further, according to the invention, a helical reinforcing member is provided in contact with the inner wall of the corrugated heat pipe over the entire length thereof or portions of the length. Thus, even when a radial pressure is externally applied to the corrugated heat pipe inserted in the ground, the pipe will never be crushed. The direction of the helical winding of the helical reinforcing member is the same as that of the helical corrugation of the corrugated heat pipe. The pitch of the helical winding of the helical reinforcing member is the same as or smaller than that of the helical corrugation of the corrugated heat pipe. With this arrangement, the flexibility of the heat pipe is not spoiled, and the pipe can sufficiently absorb the thermal expansion of the rope-like tension member. Where the direction of the helical winding of the helical reinforcing member is opposite to the direction of the helical corrugation of the corrugated heat pipe, the helical winding of the helical reinforcing member may have any desired pitch. In this case, effects obtainable where the helical winding of the reinforcing member and helical corrugation of the corrugated heat pipe are in the same direction, can be obtained without the reinforcing member received in the groove of the pipe corrugation.

Still further, according to the invention a liquid condensate receptacle is attached on a rope-like tension member extending through the corrugated heat pipe in the longitudinal direction thereof. The liquid condensate receptacle receives liquid condensate cooled in and dropped from an upper portion of the pipe. The liquid received in the receptacle is evaporated toward the pipe upper portion. This has an effect of preventing the pipe upper portion from drying. Further, according to the invention a wick presenting a capillarity is provided on the rope-like tension member extending longitudinally through the corrugated heat pipe over the entire length of the member or portions of the length. The wick can retain liquid condensate, and the retained liquid condensate is evaporated toward the pipe upper portion to prevent the pipe upper portion from drying.

Furthermore, according to the invention a rope-like tension member secured at both ends is provided along the outer peripheral surface of the corrugated heat pipe in the longitudinal direction thereof. The rope-like tension member support the weight of the corrugated heat pipe when the pipe is inserted in the ground to prevent the pipe from elongating due to the weight thereof, thus preventing the corrugated outer periphery of the pipe from locally flattening or breading.

Further, according to the invention there is provided a corrugated heat pipe sealed at both ends, having a longitudinally corrugated peripheral wall, containing operating liquid therein, and a rope-like tension member extending through it in its longitudinal direction and secured at both ends, which corrugated heat pipe includes a supporting member disposed between a portion of the rope-like tension member and a recessed inner wall portion of it to let the weight of the corrugated heat pipe be supported between the ropes-like tension member portion and recessed inner wall portion. The weight of the corrugated heat pipe is supported by the supporting member and transferred to the rope-like tension member so that it is supported thereby. More specifically, a supporting member, which is composed of helical or ring-like wire member or helical or disk-like plate member suited to the shape of the wavy groove of the corrugated heat pipe inner wall, is provided between the rope-like tension member and the wavy groove of the corrugated heat pipe inner wall in the longitudinal direction of the pipe. The weight of the corrugated heat pipe is supported by the supporting member and transferred to the rope-like tension member, so that it is supported thereby. Since the weight of the corrugated heat pipe is supported by the supporting member when the pipe is inserted in the ground, it is possible to prevent the pipe from elongating due to the weight thereof, thus preventing the corrugated outer periphery of the pipe from locally flattening or breaking.

BRIEF DESCRIPTION OF THE DRAWINGS

FIG. 9 is a schematic fragmentary view showing a further modification of the corrugated heat pipe of FIGS. 3 and 4, in which rope-like tension members are held in close contact with the pipe outer periphery by hinged strip-like members;

FIG. 10 is a sectional view taken along line X—X in FIG. 9 and viewed in the direction of arrow;

DETAILED DESCRIPTION OF THE PREFERRED EMBODIMENTS

Now, preferred embodiments of the corrugated heat pipe according to the invention will be described with reference to the accompanying drawings.

Figure 1:
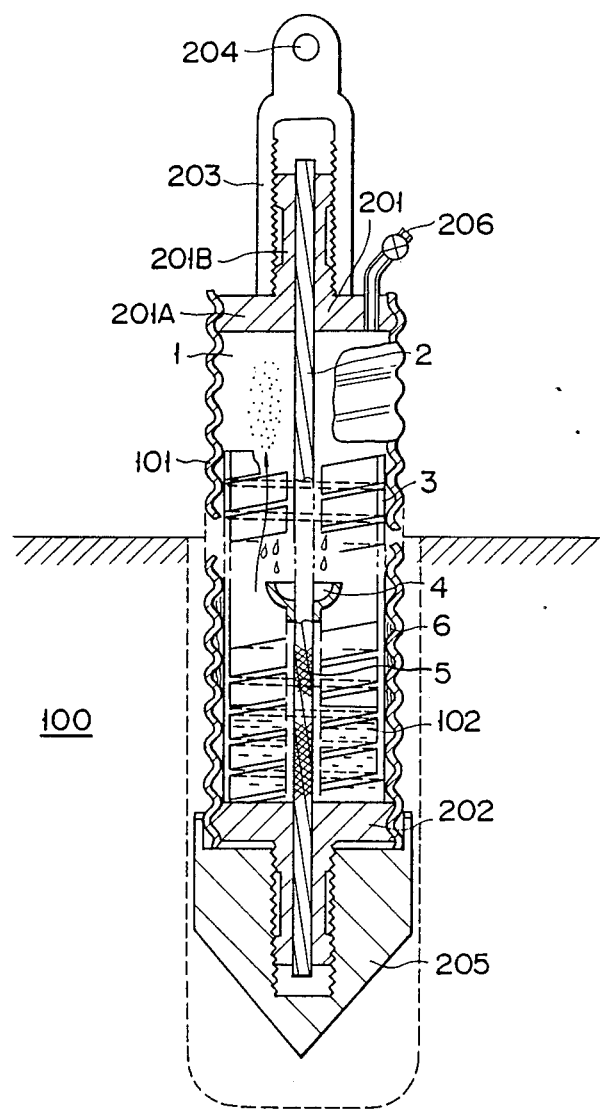
FIG. 1 is a schematic sectional view showing an embodiment of the corrugated heat pipe according to the invention.
Figure 2:
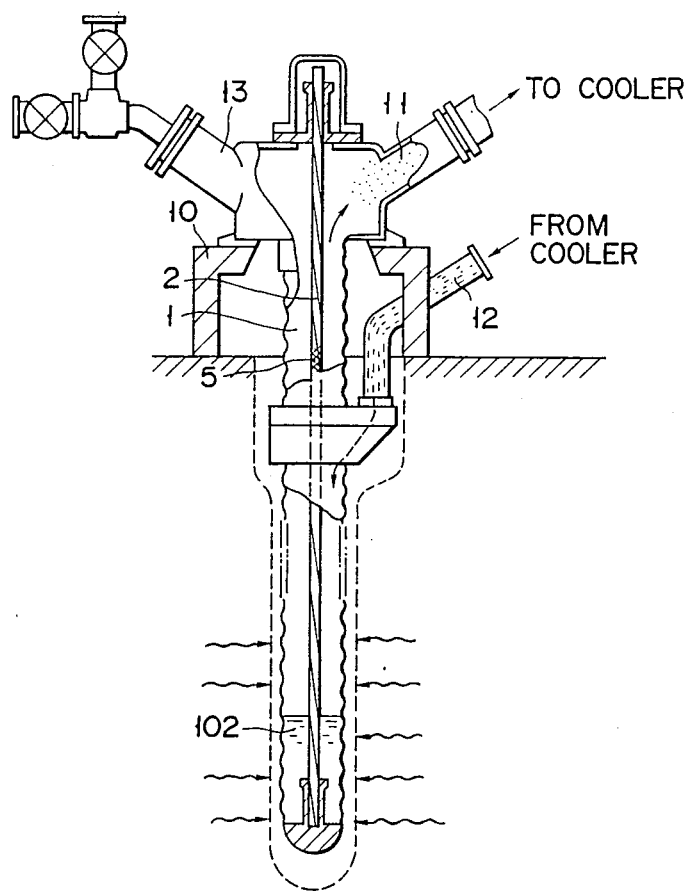
FIG. 2 is a schematic sectional view, to a reduced scale, showing the corrugated heat pipe of FIG. 1 in a state mounted in an on-ground building structure.

FIG. 1 is a schematic sectional view showing an embodiment of the corrugated heat pipe according to the invention, and FIG. 2 shows the corrugated heat pipe of FIG. 1 in a state mounted in an on-ground structure. In FIG. 2, the inner arrangement of the corrugated heat pipe is shown in a simplified form compared to FIG. 1 for the sake of simplicity.

Corrugated heat pipe 1 as shown, has flexibility, and its upper portion including a hanger portion extends on the ground. Its main portion is inserted substantially vertically in the ground 100. Usually, the corrugated heat pipe is inserted into a depth of 200 to 3000 m.

The corrugated heat pipe is made of such metal as steel, copper, aluminum and stainless steel and has an inner diameter of 50 to 300 mm. Its peripheral wall 101 is wavy, i.e., corrugated, in the longitudinal direction. The corrugated heat pipe contains therein operating liquid 102, e.g., "Furon" (a trademark).

The form of corrugation of peripheral wall 101 may be either helical or non-helical, e.g., bellows-like.

Rope-like tension member 2, which is composed of stranded steel or like wires, is provided inside the sealed corrugated heat pipe, and extends coaxially therethrough, and its upper and lower ends are fittedly secured in center holes in upper and lower end securement members 201 and 202 provided at the upper and lower ends of the corrugated heat pipe. Actually, the ends of rope-like tension member 2 are secured to the end securement members by means of press clamping, welding, etc. The operation of securement is done in factory. The rope-like tension member 2 may be a stranded rope of fine steel wires, a hempen rope, a stranded rope of fine plastic fibers, a stranded rope of fine carbon fibers, or the like. Upper end securement member 201 has a disk-like sealing portion having a central hole and a coaxial cylindrical boss portion also having a central hole. A portion of the rope-like tension member inserted in the central hole of the sealing portion is welded to or screwedly coupled to the same, whereby the upper end of corrugated heat pipe 1 is sealed. A portion of the rope-like tension member inserted in the central hole of the boss portion is secured to the same by means of press clamping, whereby a great hanging load of the corrugated heat pipe is supported.

Upper end securement member 201 is coaxially secured by means of screwing to hanger 203. Hanger 203 is provided with hole 204 formed therein for facilitating the operation when the corrugated heat pipe is transported and installed.

The lower end of rope-like tension member 2, like the upper end, is inserted in the central hole of securement member 202 and secured to lower end thereof. The lower end of the corrugated heat pipe is thus sealed.

The boss portion of lower end securement member 202 is protected by cap member 205. The means of securing the upper and lower ends of rope-like tension member 2 are not limited to the above means.

Reinforcing member 3 is composed of a steel or like metal strip which is wound helically. It is mounted in contact with the inner wall of corrugated heat pipe 1 such that it will not slip down. Before it is mounted, it may be contracted by cooling, so that it may be expanded to the normal size after the mounting. It may be mounted over the entire length of the corrugated heat pipe or a portion of the length. It is effective and desired that reinforcing member 3 is used for a portion of the corrugated heat pipe inner wall which is inserted deep in the ground.

Where corrugated heat pipe 1 has a helical corrugation, the pitch of helical winding of reinforcing member 3 may be equal to or smaller than the pitch of helical corrugation of pipe 1. The metal strip constituting reinforcing member 3 may have any sectional profile, e.g., a circular or angular profile, so long as the flexibility of corrugated heat pipe is not spoiled.

Liquid condensate receptacle 4 is a member having a recess open upward such as a dish or a cup. It may be attached on rope-like tension member 2 by fitting its central hole thereon. Liquid condensate receptacles may have size and be used in number determined by taking the inner diameter, length and heat transport capacity of the corrugated heat pipe. Receptacle 4 may be attached on rope-like tension member 2 over the entire length thereof or a portion or portions. Further, they may be provided closely or at an interval over the entire length or a portion or portions. They may be readily attached in factory.

Rope-like tension member 2 is not limitative as corrugated heat pipe support means; for instance it is possible to use like rope extending through the corrugated heat pipe.

Reference numeral 5 designates a wick. It is composed of a metal net or very fine wires and provided suitably on rope-like tension member 2. It may be provided on rope-like tension member 2 over the entire length thereof or a portion or portions. Further, it may be provided closely or at an interval over the entire length or a portion or portions. Furthermore, the wick may be constituted by rope-like tension member 2 itself. Further, it may be buried in rope-like tension member 2. Further, it may be provided on a rope substituted for rope-like tension member 2 over the entire length thereof or a portion or portions.

Wick 6 which is provided between the inner wall of the corrugated heat pipe and reinforcing member 3 is composed of a metal net, fine wires, etc. It may be clamped between the inner wall of corrugated heat pipe 1 and reinforcing member 3 by making use of the contact pressure therebetween. Further, very fine wires may be preliminarily wound on the metal strip of reinforcing member, and then the resultant assembly may be wound into a helical form having a predetermined number of turns, thus obtaining wick 6.

Wick 6, like wick 5, may be provided on the corrugated heat pipe inner wall over the entire length thereof or a portion or portions.

Evacuation/liquid supply nozzle 206 is provided for evacuating and supplying liquid to corrugated heat pipe 1.

FIG. 2 shows corrugated heat pipe 1 of FIG. 1 which is secured to and supported by on-ground building structure 10.

Reference numeral 11 designates a terrestrial heat conducting pipe, through which the terrestrial heat is transferred to a cooler (not shown). Reference numeral 12 designates a return pipe, through which liquid condensate produced as a result of cooling in the cooler is recirculated to corrugated heat pipe 1. Reference numeral 13 designates a branch pipe, which is used for evacuation, exhausting as well as the operation and monitoring of pressure gauges, safety valves, etc.

Corrugated heat pipe 1 may be provided with local heat insulation and/or corrosion-proof or other protective treatment, if necessary.

Figures 3, 4:
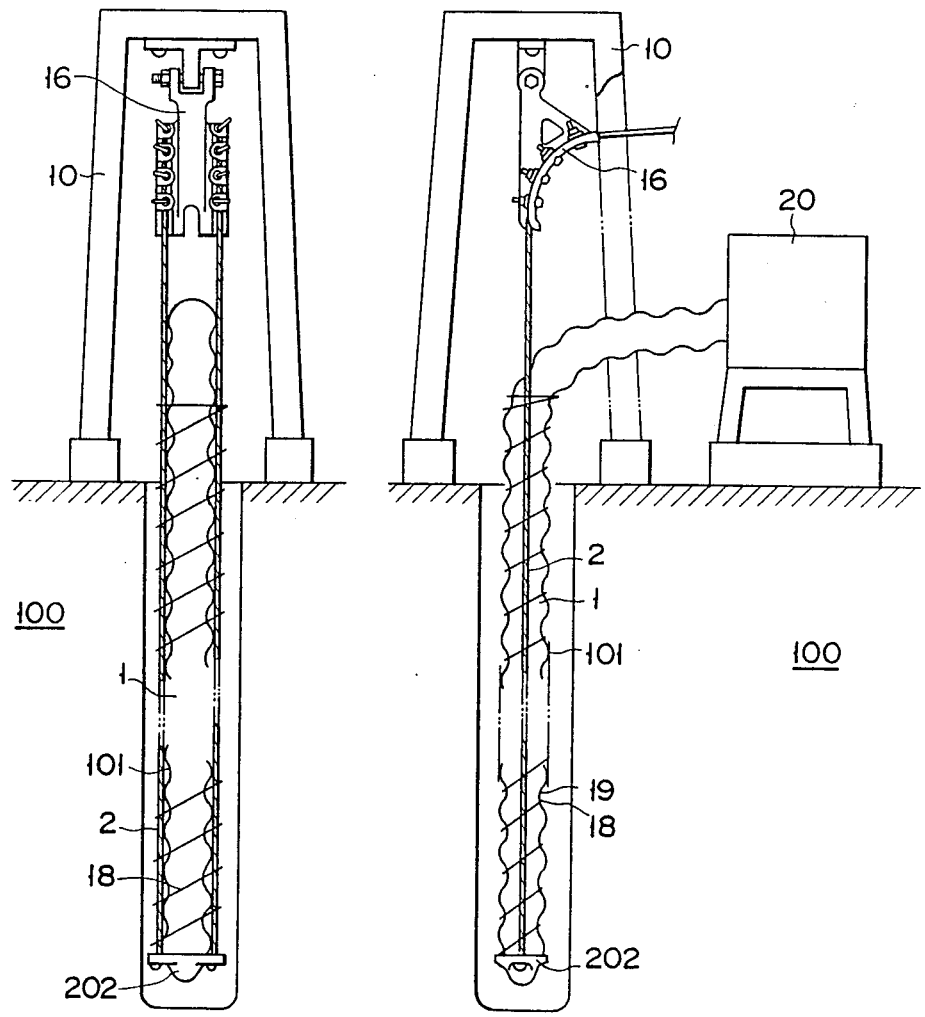
FIG. 3 is a schematic elevational sectional view showing a different embodiment of the corrugated heat pipe according to the invention.
FIG. 4 is a schematic side sectional view showing the corrugated heat pipe of FIG. 3.

FIGS. 3 and 4 illustrate a different embodiment of the invention. In these Figures, parts like those in FIGS. 1 and 2 are designated by corresponding reference numerals, and their detailed description is omitted.

In the previous embodiment of FIGS. 1 and 2, the rope-like tension member is provided inside the corrugated heat pipe. In this embodiment, rope-like tension members 2 are provided outside the corrugated heat pipe. Rope-like tension members 2 are composed of steel wire stands and extend along the outer peripheral surface of corrugated heat pipe 1 in the longitudinal direction thereof. Their lower end is secured by means of press clamping to lower end securement member 202 of corrugated heat pipe. The securing operation may be done in factory. Their upper portion projected from the ground surface is clamped by clamp 16. Rope-like tension members 2 are supported by on-ground building structure 10 via clamp 16.

One or more (practically four or more) rope-like tension members 2 are used depending on the size and weight of corrugated heat pipe 1. The number of rope-like tension members provided on the outer peripheral surface of corrugated heat pipe 1 and also the number and diameter of stranded wires, are suitably selected depending on desired mechanical strength. Since a plurality of rope-like tension members are provided on the outer peripheral surface of corrugated heat pipe 1, their inspection and maintenance may be readily done even in the event of occurrence of damage to some of them.

Figure 5:
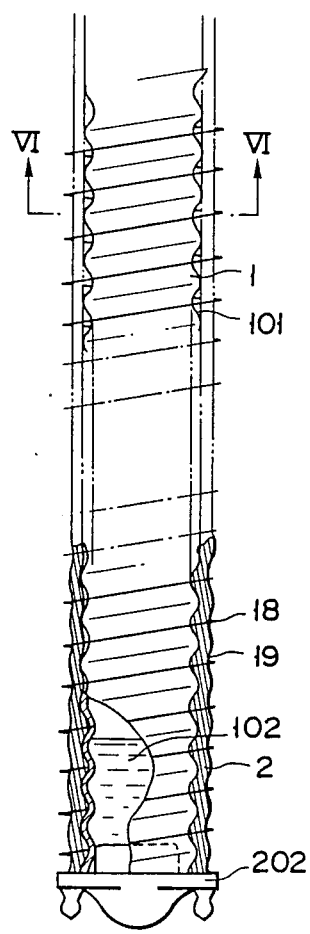
FIG. 5 is a schematic fragmentary view showing a modification of the corrugated heat pipe of FIGS. 3 and 4 with a wire member wound on the pipe at the pitch of the helical corrugation of the pipe periphery.
Figure 6:
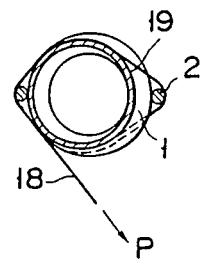
FIG. 6 is a sectional view taken along line VI—VI in FIG. 5 and viewed in the direction of arrow.

Reference numeral 18 designates a wire, which is a solid or stranded metal wire. As shown in FIG. 5, it is wound helically and continuously on the outer peripheral surface of corrugated heat pipe 1 over a necessary length thereof at a substantially constant pitch, whereby rope-like tension members 2 are held in close contact with the periphery of pipe 1. Where periphery of corrugated heat pipe 1 is corrugated helically, wire 18 is drawn with tensile force P (as shown in FIG. 6) while adjusting its position such that it is accommodated in helical groove 19 of corrugation at the pitch thereof. The ends of wire 18 thus wound are treated by suitable available means so that the wire will not become loose. Wire 18 may be wound at a constant pitch, i.e., at the same pitch as the pitch of corrugation of the corrugated heat pipe, or the pitch may be reduced so that the wire is wound more closely where the own weight is greatly supported.

Further, wire 18 may be wound helically, or it may be wound helically in one direction and then in the opposite direction so that it turns overlap. Where corrugated heat pipe 1 has a bellows-like corrugation, wire 18 of course may be wound either helically or non-helically.

The various components of the corrugated heat pipe may be mounted in factory or in the site of installation. A portion of the corrugated heat pipe extending from the ground surface is connected to cooler 20. Operating liquid 102, which is sealed under a reduced pressure condition in the corrugated heat pipe (FIG. 5), repeats a cycle of being evaporated by the terrestrial heat to enter cooler 20 and transfer its heat thereto, thus being condensed into liquid to be recirculated to the bottom of the corrugated heat pipe for evaporation again.

Figure 7:
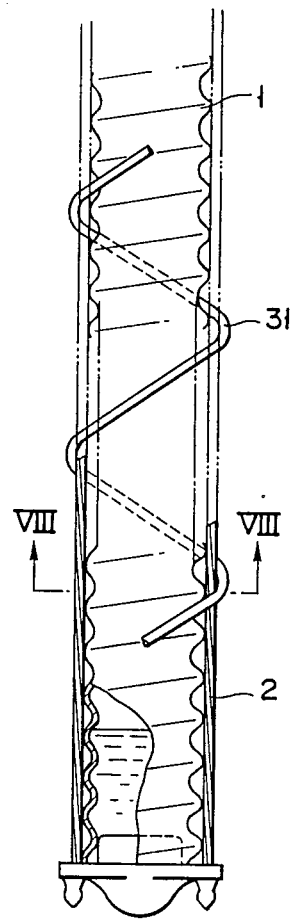
FIG. 7 is a schematic fragmentary view showing a different modification of the corrugated heat pipe of FIGS. 3 and 4, in which rope-like tension members are held in close contact with the pipe outer periphery by a preformed wire member.
Figure 8:
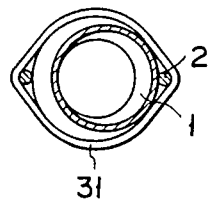
FIG. 8 is a sectional view taken along line VIII—VIII in FIG. 7 and viewed in the direction of arrow.

FIGS. 7 and 8 illustrate a modification of the corrugated heat pipe shown in FIGS. 5 and 6.

In this modification, rope-like tension members are held in close contact with corrugated heat pipe 1 by a preformed helical wire. More specifically, like the embodiment of FIGS. 3 to 6, preformed helical wire 31 in a helical form at a substantially constant pitch and having a suitable length is wound on the outer peripheral surface of corrugated heat pipe 1 as means for holding rope-like tension members 2 extending along the outer periphery of pipe 1 in the longitudinal direction thereof in close contact with pipe 1. Preformed helical wire 31 is made of a metal having comparatively high spring characters, e.g., steel or non-ferrous metals or alloys. The helical winding of wire 31 has an inner diameter slightly smaller than the outer diameter of corrugated heat pipe 1 inclusive of rope-like tension members 2. In this case, when wire 31 is fitted manually, an adequate spring pressure is provided to eliminate slip between rope-like tension member 2 and corrugated heat pipe 1. If necessary, a plurality of preformed helical wires 31 may be used such that they are assembled in advance into a strip-like form. Further, the inner side of the helical winding of wire may be sanded to provide enhanced frictional force. In this case, it is possible to prevent slip between preformed helical wire 31 and corrugated heat pipe 1 and effectively support the weight of the corrugated heat pipe. Such preformed helical wire 31 need not be provided over the entire length of pipe 1, but it may be provided on suitable portion of pipe 1 in the longitudinal direction thereof (for instance at a longitudinal interval of 5 m). Thus, preformed helical wire 31 may be readily mounted at the installation site. In this case, the wire may be provided at a constant interval as in the embodiment of FIG. 7, but it may be provided more closely where much weight is supported.

Preformed helical wire 31 may be suitably provided irrespective of whether the periphery of corrugated heat pipe 1 has a helical or bellows-like corrugation.

FIGS. 9 and 10 show a modification of the embodiment of FIGS. 3 to 6. In this case, hinged strip-like members are used as means for holding the rope-like tension members in close contact with the corrugated heat pipe.

More specifically, in this case strip-like members 33 each with hinge 32 are used. Each strip-like member 35 is set to surround corrugated heat pipe 1 and rope-like tension members and then clamped by turning screw 34 to reduce clamping gap 35. It is made of such material as steel or non-ferrous metals or alloys It has substantially the same inner shape and diameter as the outer diameter of corrugated heat pipe 1 inclusive of rope-like tension members 2. It comprises two halves hinged together by hinge 32, and it is secured to corrugated heat pipe 1 in a surrounding state by clamping it with screw 34 at clamping gap 35. Since strip-like members 33 are clamped, no slip is produced between rope-like tension members and corrugated heat pipe. Strip-like members 33 may be provided on corrugated heat pipe 1 at suitable portions thereof in the longitudinal direction (for instance at an interval of 5 m). Therefore, the operation of holding the rope-like tension members in close contact with the corrugated heat pipe may be readily done at the installation site. Instead of strip-like member 33, two striplike members without any hinge may be used. In this case, the two strip-like members are set face to face on the pipe outer periphery, and their opposed edges are clamped with screws at clamping gaps. Further, it is possible to use a strip-like member set which comprises of more than two separate sections.

Figure 11:
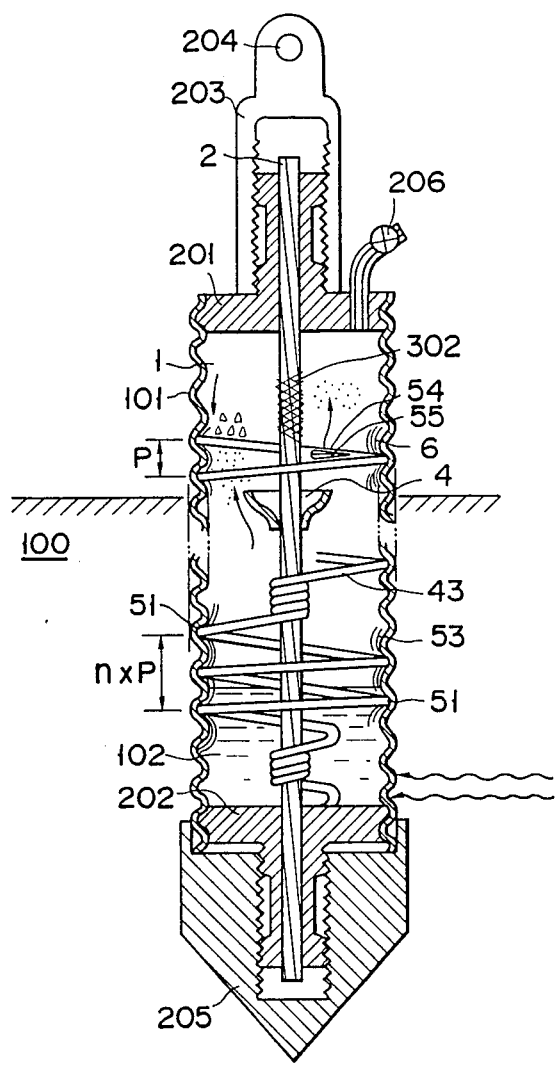
FIG. 11 is a schematic elevational sectional view showing a further embodiment of the corrugated heat pipe according to the invention.
Figure 12:
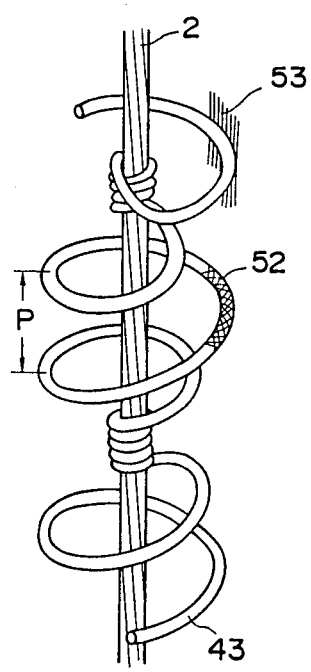
FIGS. 12 to 15 are perspective views showing respective examples of a supporting member used for the corrugated heat pipe of FIG. 11.

FIGS. 11 and 12 illustrate a further embodiment of the invention. In these FIGS., parts like or corresponding to those in the embodiment of FIG. 1 are designated by corresponding like reference numerals, and their description is omitted.

In this embodiment, supporting wire 43 is used instead of the reinforcing member in the embodiment of FIG. 1. Supporting wire 43 is an elastic or rigid wire, e.g., a steel wire. It is disposed helically between and in close contact with rope-like tension member 2 and recessed inner wall portion of corrugated heat pipe 1 (i.e., valleys of corrugation when viewed from the inner side of pipe 1).

More specifically, some of supporting wire 43 is helically wound on predetermined portions of rope-like tension member 2 in the longitudinal direction thereof, while the remainder is received in and held in close contact with helically recessed inner wall 51 or valleys of corrugated heat pipe 1.

Wick 53 is provided on some predetermined portions of supporting wire 43. It may be provided over the entire length of supporting wire 43 or portions of the lengths.

FIG. 12 shows a way of securement of wick 53. In this case, wick 53 is held secured in the recessed inner wall of the pipe by supporting wire 43.

The length, for which supporting wire 43 is wound on rope-like tension member 2, and the length, for which the supporting wire is held in close contact with the helical recessed inner surface of corrugated heat pipe 2 (i.e., the product of the number n of turns in close contact and the pitch p), are suitably selected such that the weight of the corrugated heat pipe is uniformly shared by the entire supporting wire. For example, the length, for which rope-like tension member 2 is held in close contact with recessed inner wall 51 of pipe 1, may be equal to or twice the pitch of corrugation of the corrugated heat pipe.

The distribution of the supporting wire is determined by taking the size (i.e., length and diameter) of corrugated heat pipe 1 and the geology and terrestrial heat temperature distribution of the place of the pipe installation into considerations. The supporting wire may be provided over the entire length of rope-like tension member 2 or portions thereof. Particularly, in the depth of the ground the supporting wire is desirably disposed collectively for a great hanging load of the pipe applied.

Further, the supporting member may be mounted in factory, or it may be mounted at the installation site by preparing a simple mounting device. In this case, the supporting member may be contracted in size by cooling it before mounting it.

Figure 13:
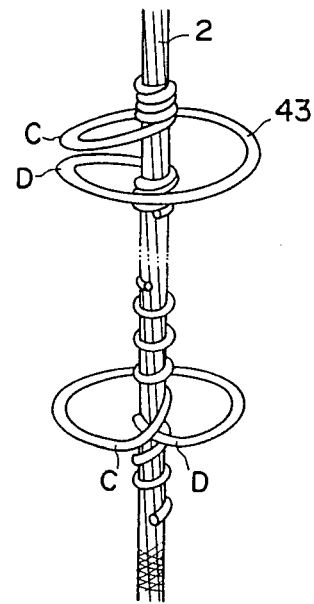

Steam passes through gaps defined by the supporting members toward upper portion of the corrugated heat pipe, that is, without being blocked by the supporting member, so that it is possible to ensure proper function of the heat pipe FIG. 13 shows a further example of the supporting wire. In this case, the corrugated heat pipe (not shown), with which the supporting wire is held in close contact, is corrugated bellows-like.

A portion of supporting wire 43 is wound on rope-like tension member 2, while the remainder is held in a ring-like form in the recessed inner peripheral wall of the pipe. In this case, opposite end portions C and D (FIG. 3) of a turn of supporting wire 43 are found at the same position in the direction of extension of the rope-like tension member. In this case, the method of mounting and distribution of the supporting wire may be the same as described before in conjunction with FIGS. 11 and 12.

Reference numeral 54 designates a supporting plate.

Figure 14:
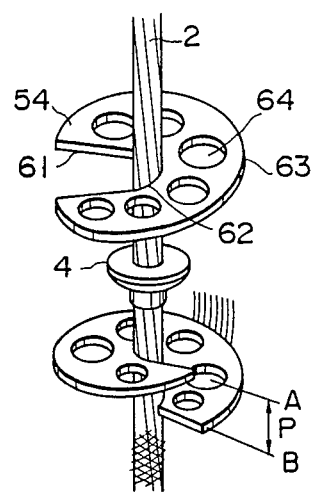

FIG. 14 shows supporting plate 54. It is substantially disk-like, and is formed from a metal plate, a plastic plate, etc. It has notch 61. Rope-like tension member 2 is closely fitted in inner end 62 of notch 61, whereby the supporting plate is held in position without possibility of slide-down. Supporting plate 54 has a helical outer periphery, which is received and held in close contact with helical recessed inner wall of the corrugated heat pipe (not shown). As shown in FIG. 14, the outer periphery of supporting plate 54 is inclined helically so that opposite ends A and B of notch 61 are spaced apart by a distance equal to the pitch P of the helical corrugation of the corrugated heat pipe. Supporting plate 54 is provided with holes 64 formed therein to permit passage of steam. Holes 64 may have any suitable shape, e.g., circular, oval, flaring, etc. The method of mounting and distribution of supporting plates 54 may be the same as for supporting wire 43 in the case of FIGS. 12 and 13.

Figure 15:
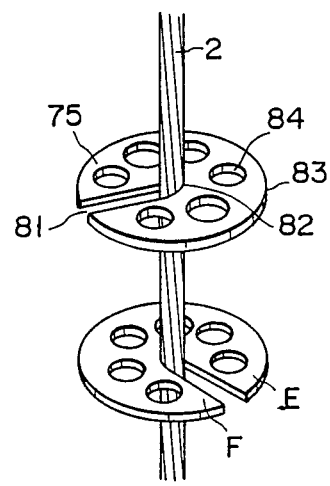

FIG. 15 shows a different example of supporting plate. This supporting plate is provided in a corrugated heat pipe having a bellows-like corrugation (not shown).

This example of supporting plate 75 is like a flat disk having notch 81. Rope-like tension member 2 is closely fitted in end 82 of supporting plate 75. The outer periphery of supporting plate 75 is closely mounted in a recessed inner peripheral wall of pipe. In this case, opposite ends E and F of notch 81 of supporting plate 75 are not spaced apart but at the same position in the direction of extension of the rope-like tension member.

Supporting plate 75 has holes 84 for permitting passage of steam. Holes 84 may have any suitable shape as in the case of FIG. 14.

Inside corrugated heat pipe 1, liquid condensate receptacle 4 having a recess open upward, e.g., like cup or a dish, is attached on rope-like tension member 2. Further, wick 302 is attached on tension-resistant rope 2. The rope-like tension member itself may serve as wick instead of particularly providing wick 302. Further, the inner peripheral wall of pipe is provided with wick 53.

In the above embodiment provided with the supporting member, there will hardly occur a slip-down between the corrugated heat pipe and supporting member due to thermal expansion.

Liquid condensate will drop on the supporting member and temporarily retained on this part. The retained or collected liquid on the supporting member is evaporated toward upper portion of the pipe. This has an effect of preventing the upper portion of the pipe from drying.

Reference numeral 206 designates an evacuation/liquid supply nozzle for evacuating and supplying liquid to corrugated heat pipe 1.

The corrugated heat pipe, of course, is further provided with other, usually used accessory devices, e.g., a terrestrial heat conducting pipe, a liquid return pipe, branch pipes, etc. Further, corrugated heat pipe 1 is supported, if necessary, by an on-ground building structure, and also it may be partly provided with heat insulation, corrosion-proof and other protective treatments.

While the above embodiments have concerned with cases where the corrugated heat pipe according to the invention is inserted vertically in the ground. This is, however, by no means limitative. For example, the corrugated heat pipe may be installed in the sea, or it may be installed such that it is inclined with respect to the ground surface. For example, where there is an obstacle in the ground, it may be installed in an inclined state to avoid such obstacle Further, it may be installed horizontally. Where the corrugated heat pipe is installed horizontally, when a force of longitudinal thermal expansion is exerted, the rope-like tension member has an effect of preventing the corrugated heat pipe from elongating and thus deforming. Thus, it is possible to maintain satisfactory heat transfer characteristics.

As has been described in the foregoing, according to the invention it is possible to provide an elongate heat pipe, which can be readily transported. This elongate heat pipe can preclude low operability works on the installation site. Further, the elongate heat pipe may be factory provided with various components. With the functions of these components, it is possible to prevent the pipe from elongating due to the weight thereof, particularly prevent the pipe from crushing due to high radial external pressure applied to its portion extending deep in the ground, and also prevent an upper portion of the pipe from drying owing to positive promotion of evaporation by the liquid condensate receptacle, wick and other parts. Further, on the installation site, it is only necessary to insert and hang the corrugated heat pipe in a pit in the simplest case.

What is claimed is:

1. A corrugated heat pipe sealed at both ends, having a longitudinally corrugated peripheral wall and containing operating liquid therein, said corrugated heat pipe comprising at least one rope-like tension member extending along its outer peripheral surface, in the longitudinal direction thereof, and secured at both ends.

2. The corrugated heat pipe according to claim 1, wherein said at least one rope-like tension member is wound on the outer peripheral surface of said corrugated heat pipe.

3. The corrugated heat pipe according to claim 2, wherein said at least one rope-like tension member is helically preformed on the outer peripheral surface of said corrugated heat pipe.

4. The corrugated heat pipe according to claim 2, wherein said at least one rope-like tension member is a helically preformed wire mounted on the outer periphery of said corrugated heat pipe.

5. The corrugated heat pipe according to claim 1, wherein said at least one rope-like tension member is helically preformed on the outer peripheral surface of said corrugated heat pipe.

6. The corrugated heat pipe according to claim 1, wherein said at least one rope-like tension member is a helically preformed wire mounted on the outer periphery of said corrugated heat pipe.

7. The corrugated heat pipe according to claim 1, further comprising a hinged strip-like member mounted on the outer periphery of said corrugated heat pipe.

8. The corrugated heat pipe according to claim 1, further comprising a splittable strip-like member mounted on the outer periphery of said corrugated heat pipe.

* * * * *

UNITED STATES PATENT AND TRADEMARK OFFICE
CERTIFICATE OF CORRECTION

PATENT NO. : 4,854,372

DATED : August 8, 1989

INVENTOR(S) : SAKAYA et al

It is certified that error appears in the above-identified patent and that said Letters Patent is hereby corrected as shown below:

In the title page, the name of the first inventor should be: --Masuji Sakaya, Narashino--.

Signed and Sealed this

Twenty-seventh Day of November, 1990

Attest:

HARRY F. MANBECK, JR.

Attesting Officer

Commissioner of Patents and Trademarks